A. WADDELL.
VEHICLE.
APPLICATION FILED JAN. 18, 1910.
982,320.
Patented Jan. 24, 1911.
3 SHEETS—SHEET 1.
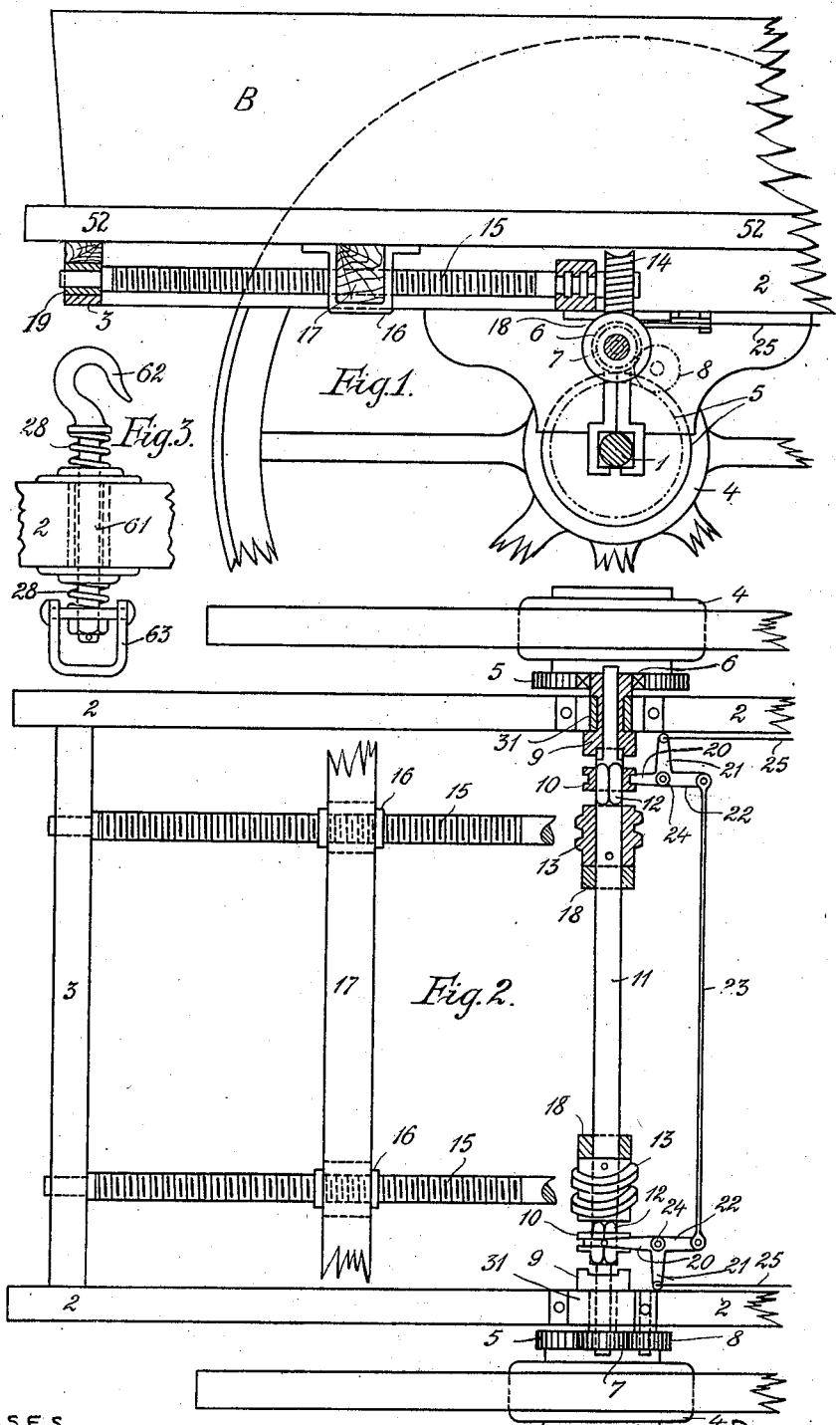

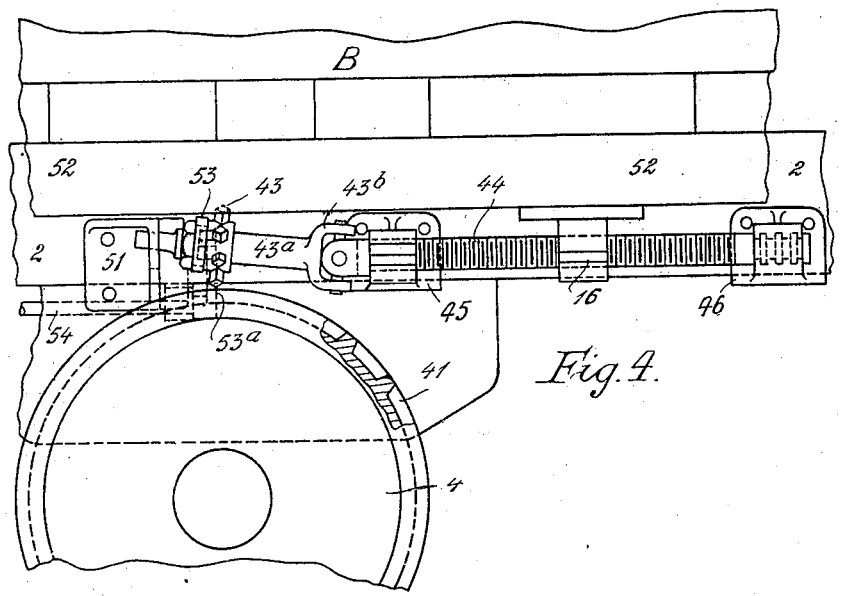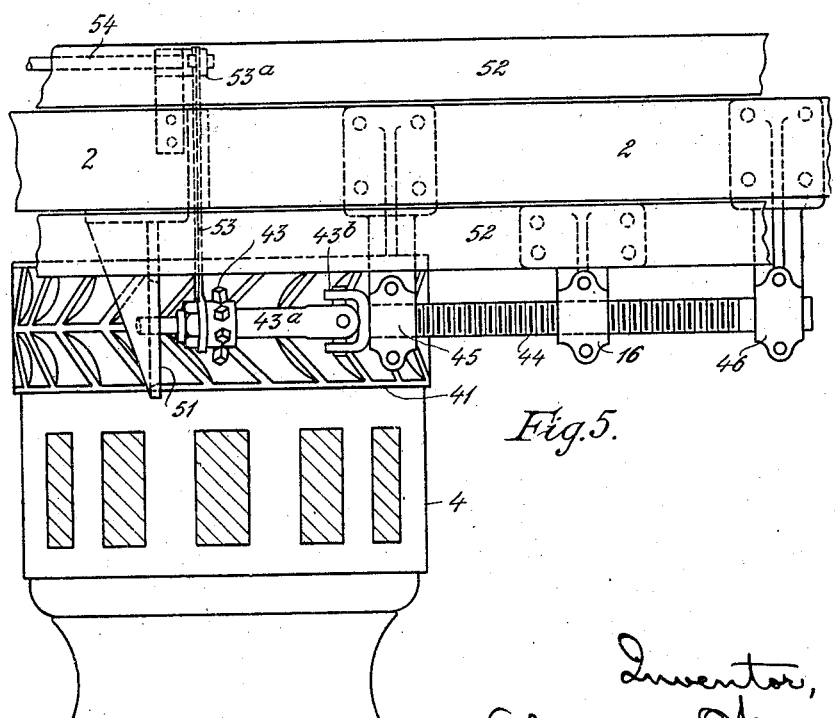

A. WADDELL.
VEHICLE.
APPLICATION FILED JAN. 18, 1910.
982,320.
Patented Jan. 24, 1911.
3 SHEETS—SHEET 3.
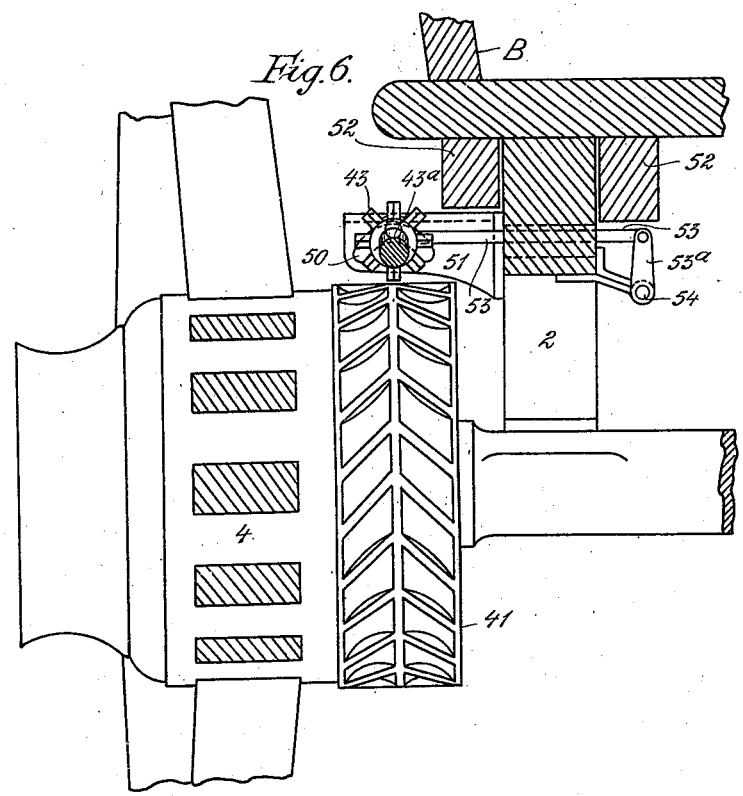
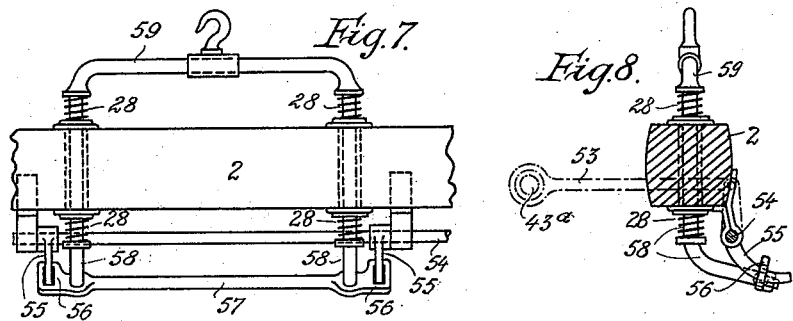
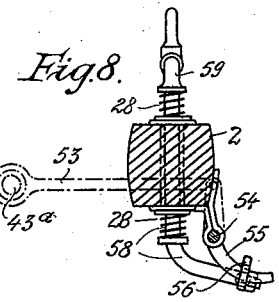
WITNESSES;
Alfred R. Anderson
F. H. Logan.
Inventor,
Alexander Waddell,
by W. H. Berrigan,
Attorney.

UNITED STATES PATENT OFFICE.

ALEXANDER WADDELL, OF DUNFERMLINE, SCOTLAND.

VEHICLE.

982,320.

Specification of Letters Patent.   Patented Jan. 24, 1911.

Application filed January 18, 1910.  Serial No. 538,714.

*To all whom it may concern:*

Be it known that I, ALEXANDER WADDELL, a subject of the King of the United Kingdom of Great Britain and Ireland, residing at Dunfermline, Scotland, have invented a certain new and useful Improvement in Vehicles, of which the following is a specification.

This invention is applicable to vehicles, more particularly to two-wheeled animal draft vehicles, and consists broadly in the utilization of the unbalancing power which tends to lift the draft animal up or bear it down to operate devices for causing the body or part of the body of the vehicle to move longitudinally, that is, either forward or backward relatively to the vehicle axle, and thereby restore the balanced condition of the vehicle under different external conditions, e. g., when the vehicle is descending or ascending an incline.

The invention further permits the restoration of equilibrium irrespective of the absence or presence or the disposition of added load and irrespective of the rate of travel of the vehicle, and in addition provides that the application of a brake shall not prevent the restoration of the state of equilibrium.

In the accompanying drawings Figure 1 is a side view, and Fig. 2 is a plan view partly in section with the body of the cart removed, showing one form of the invention. Fig. 3 shows details thereof. Figs. 4, 5 and 6 are respectively side view, plan view and transverse section showing a modification. Figs. 7 and 8 show details thereof.

Referring to Figs. 1, 2 and 3, the axle 1 is attached in the usual manner to the trams 2, or to the prolongation of the tram of the vehicle, which may be connected by cross bars 3. To the naves 4 of the road wheels are fixed toothed wheels 5. One of the said toothed wheels 5 gears direct with a toothed pinion 6, which is therefore driven in the direction opposite to that of the road wheel. The other spur wheel 5 drives an intermediate pinion 8, which in turn drives a toothed pinion 7; the said toothed pinion 7 therefore rotates in the same direction as the road wheel. The pinions 6 and 7 are suitably mounted co-axial with the shaft 11 which is carried in bearings 31 fixed to the trams 2. The said pinions 6 and 7 are each fixed to a tubular sleeve at the other end of which are formed dog clutch teeth 9. Dog clutches 10 are mounted on squared parts 12 of the shaft 11 in such a manner that they can be engaged and disengaged with the dog clutch teeth 9. The said dog clutches are moved longitudinally on the shaft 11 by means of forked levers 20 suitably fulcrumed at 24 on the trams 2 of the vehicle. The said forked levers are each integral with a lever 21 which can be pulled by a Bowden wire 25 or other element connected to the harness portion of the mechanism comprising, for example, a bolt 61 (Fig. 3) passing through the forward end of each tram 2 and having a suitable hook 62 and shackle 63 for the attachment of the back band and belly band respectively of the harness, said bolt acting in conjunction with two springs 28 which tend to keep it in a mean or neutral position. The Bowden wires 25 are guided along the trams 2 and are connected to the bolts 61 so that relative movement between said trams and said bolts imparts a corresponding movement to one or other of said wires, thereby causing a pull on the corresponding lever 21. As shown in Fig. 3 one wire is connected to the hook of its corresponding bolt 61 and the other wire is connected to the shackle of its corresponding bolt 61. Integral with the said forked lever 20 is an extension lever 22. The two extension levers 22 are connected by a rod 23. Thus on pulling one of the wires 25 both clutches 10 are moved simultaneously longitudinally on the shaft 11.

In the position shown in Fig. 2 the clutches 10 are in the neutral position; if they are moved in one direction the shaft 11 is driven by the road wheel in one direction, if they are moved in the opposite direction, the shaft 11 is driven in the opposite direction. Fixed to and rotating with the shaft 11 are two worms 13 which engage respectively with two worm wheels 14 fixed to the ends of two screwed spindles 15 which are mounted in bearings 19 fixed to the cross pieces 3 of the trams. The journal bearings 18 which are fastened to a cross bar connecting the trams of the vehicle, serve also as thrust bearings for the worm or worms. The said spindles 15 engage with nuts 16 fixed to the cross bar 17 which is attached to or forms part of the body B of the vehicle and thus transmit longitudinal movement to said body, either backward or forward, according to which clutch is engaged, on movement of the tram or trams relatively to the bolt or other part to which the back band and the belly band of the harness is attached. The body of the vehicle has secured to it—one on each side of the tram or trams—longitudinal guide bars 52.

Referring to Figs. 4, 5, 6, 7 and 8, the mechanism for transmitting movement to the body of the vehicle comprises a wheel 41 preferably secured to the nave 4 of the road wheel and having right and left hand spiral teeth adapted to be engaged by a wheel 43 secured to a shaft 43$^a$ connected by a universal joint 43$^b$ to a screw-threaded shaft 44 and having teeth shaped like prismoidal studs whereby rotary movement may be imparted to said shaft 44 which is mounted on two bearings 45 and 46 secured to the tram 2 and engages with the nut 16 attached to the body of the vehicle, said body being provided with guide bars 52—one on each side of the tram or trams. The wheel 43 may be moved into or out of engagement with the teeth on either side of the wheel 41 by means of the free end of the shaft 43$^a$ engaging a cam shaped slot 50 in a bracket 51 secured to the tram of the vehicle whereby the teeth of the wheel 43 are not in engagement with the teeth of the wheel 41 when the free end of the shaft 43$^a$ is in a position midway between the ends of the slot 50 along which slot the shaft 43$^a$ is moved by means of an arm 53 connected thereto and operated by an arm 53$^a$ attached to a rocking shaft 54 which is adapted to be rocked by means of trip levers 55 near the forward end of the tram or trams. The trip levers 55 engage eye pieces 56 on a bar 57 to which the belly band of the harness is attached and which bar is connected by bolts 58 passing through the tram and formed at the ends of a bar 59 having a hook to which the back band of the harness is attached. The springs 28 serve to retain the wheel 43 in neutral or mid-position relatively to the teeth of the wheel 41.

A brake or brakes may be used in conjunction with the above apparatus, said brake or brakes being mounted on the vehicle so that as the body of the vehicle is moved backward when descending an incline, the brake or brakes will be applied in such manner that the pressure of the brake block will depend on the position of the body of the vehicle.

Having now described my invention what I claim and desire to secure by Letters Patent of the United States is:—

1. In a two-wheeled animal draft vehicle, the combination with a wheeled frame adapted to tilt around the wheel-axle as a center, of a body part slidable longitudinally of said frame, mechanism for sliding the body part, and means for controlling the operation of said mechanism, said means being dependent for their operation on the tilting of the frame.

2. In a two-wheeled animal draft vehicle, the combination with a wheeled frame adapted to tilt around the wheel axle as a center, of a body part movable longitudinally of said frame, mechanism for moving said body part including an element rotating with the road wheels of the vehicle, and means for controlling the operation of said mechanism, said means being dependent for their actuation upon the tilting of the frame.

3. In a two-wheeled animal draft vehicle, the combination with a wheeled frame adapted to tilt around the wheel axle as a center, of a body part movable longitudinally of said frame, mechanism for moving said body part including an element rotating with the road wheels of the vehicle, an engaging device for said mechanism, and means for actuating said engaging device, said means being dependent for their actuation upon the tilting of the frame.

In testimony whereof I have signed my name to this specification in the presence of two subscribing witnesses.

ALEXANDER WADDELL.

Witnesses:
JOHN McCLEARY, Jr.,
DANIEL McALLAN, Jr.